(12) United States Patent
Muchalov

(10) Patent No.: US 9,669,998 B2
(45) Date of Patent: Jun. 6, 2017

(54) CONVEYOR DRIVE SYSTEM

(71) Applicant: Ivan Muchalov, Erin (CA)

(72) Inventor: Ivan Muchalov, Erin (CA)

( * ) Notice: Subject to any disclaimer, the term of this patent is extended or adjusted under 35 U.S.C. 154(b) by 0 days.

(21) Appl. No.: 15/177,371

(22) Filed: Jun. 9, 2016

(65) Prior Publication Data

US 2017/0043958 A1    Feb. 16, 2017

Related U.S. Application Data

(60) Provisional application No. 62/204,132, filed on Aug. 12, 2015.

(51) Int. Cl.
| | |
|---|---|
| *B65G 15/02* | (2006.01) |
| *B65G 23/24* | (2006.01) |
| *B65G 23/16* | (2006.01) |
| *B65G 15/00* | (2006.01) |
| *B65G 15/42* | (2006.01) |

(52) U.S. Cl.
CPC ............. *B65G 23/16* (2013.01); *B65G 15/00* (2013.01); *B65G 15/02* (2013.01); *B65G 15/42* (2013.01)

(58) Field of Classification Search
CPC ........ B65G 23/06; B65G 23/32; B65G 23/24; B65G 23/14; B65G 15/02; B65G 15/30; B65G 21/18; B65G 2207/24
USPC ......................................... 198/831, 834, 778
See application file for complete search history.

(56) References Cited

U.S. PATENT DOCUMENTS

| | | | |
|---|---|---|---|
| 2,446,890 A * | 8/1948 | Frank Stadelman .. | B65G 17/06 198/831 |
| 3,682,295 A * | 8/1972 | Roinestad ............... | B65G 21/18 198/778 |
| 4,179,026 A * | 12/1979 | de Vries ................. | B65G 15/02 198/831 |
| 4,185,737 A | 1/1980 | Blattermann | |
| 4,433,777 A | 2/1984 | Densmore | |

(Continued)

FOREIGN PATENT DOCUMENTS

| | | |
|---|---|---|
| CA | 2896682 | 7/2014 |
| CA | 2896685 | 7/2014 |

(Continued)

OTHER PUBLICATIONS

International Search Report & Written Opinion in PCT/CA2016/000207 dated Nov. 4, 2016.

*Primary Examiner* — James R Bidwell
(74) *Attorney, Agent, or Firm* — Manelli Selter PLLC; Edward J. Stemberger

(57) ABSTRACT

A conveyor system, is provided having a continuous looped conveyor belt having first and second conveyor belt portions, first and second opposite ends, and having first and second direction reversing members disposed at the first and second opposite ends. Each of the first and second conveyor belt portions also has an upper surface, and a lower surface. A series of regularly spaced followers are provided on the belt, and these followers are moved by a conveyor belt drive mechanism comprising at least one rotational drive member which is positioned in, and which rotates in, a plane which is parallel to the upper or lower surfaces of the first or second conveyor belt portions. The rotational drive member includes a series of teeth on the drive member. When rotated, the teeth releaseably engage with the followers on the belt to provide a low profile conveyor drive system.

18 Claims, 9 Drawing Sheets

(56) References Cited

U.S. PATENT DOCUMENTS

| | | | | |
|---|---|---|---|---|
| 5,139,135 | A * | 8/1992 | Irwin | B65G 17/086 198/778 |
| 5,178,261 | A | 1/1993 | Matheson et al. | |
| 5,228,557 | A * | 7/1993 | Lago | B65G 21/18 198/778 |
| 5,454,467 | A | 10/1995 | Lago | |
| 5,839,570 | A | 11/1998 | Vertogen et al. | |
| 5,944,171 | A | 8/1999 | Vertogen et al. | |
| 5,992,615 | A | 11/1999 | Muchalov | |
| 6,105,755 | A | 8/2000 | Muchalov | |
| 6,564,931 | B1 | 5/2003 | Edelmann | |
| 6,843,366 | B2 | 1/2005 | Shiotani | |
| 7,676,741 | B2 | 3/2010 | McGatha et al. | |
| 7,762,388 | B2 * | 7/2010 | Lago | B65G 17/063 198/778 |
| 8,113,339 | B2 * | 2/2012 | Lenord | B65G 23/10 198/832 |
| 8,162,132 | B2 * | 4/2012 | Muller | B65G 19/30 198/779 |
| 8,167,121 | B2 | 5/2012 | Yuasa et al. | |
| 8,302,765 | B2 * | 11/2012 | Lago | B65G 17/064 198/778 |
| 8,701,874 | B2 * | 4/2014 | Knigge | B65G 15/62 198/831 |
| 9,440,793 | B2 * | 9/2016 | Matsuzaki | B65G 17/063 |
| 2006/0252588 | A1 | 11/2006 | Fandella | |
| 2013/0068595 | A1 | 3/2013 | Layne et al. | |

FOREIGN PATENT DOCUMENTS

| | | | |
|---|---|---|---|
| DE | 4219097 | * 12/1992 | B65G 21/16 |
| DE | 102014118022 | 6/2016 | |
| GB | 2337973 | 12/1999 | |
| WO | 2004063059 | 7/2004 | |
| WO | 2015079412 | 6/2015 | |

* cited by examiner

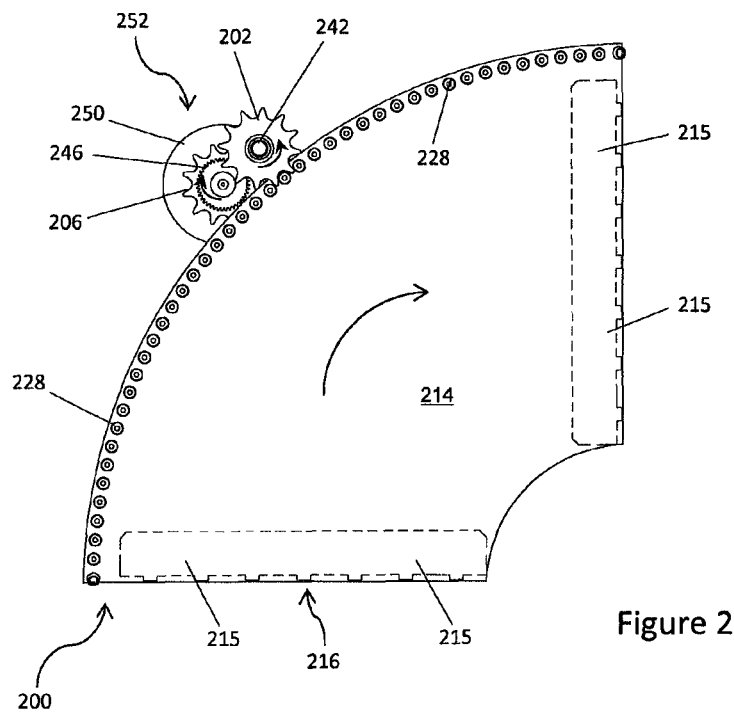
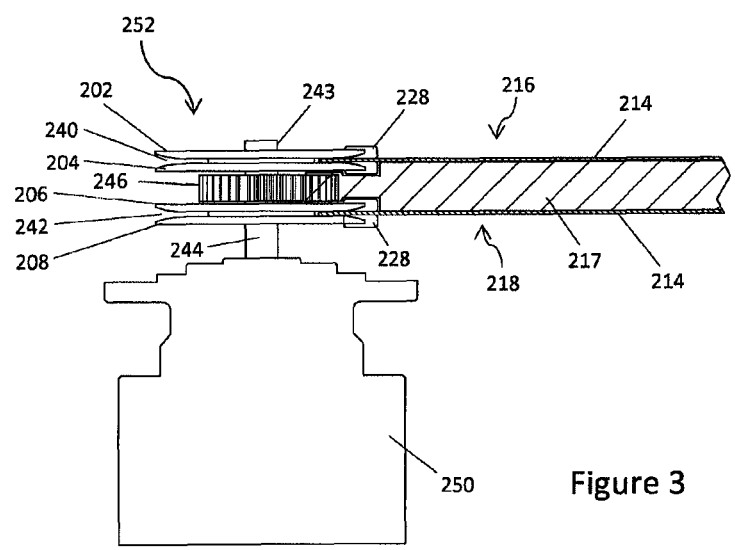
Figure 2
Figure 3

CONVEYOR DRIVE SYSTEM

FIELD OF THE INVENTION

The present invention relates to the field of conveyors, and in particular o a conveyor drive system.

BACKGROUND OF THE INVENTION

In manufacturing processes, it is common to move goods from one position to the next by use of conveyor systems having straight or curved conveyor sections. Typically, straight conveyor systems include continuous loop conveyor belts wherein the belts are propelled on a top surface or deck, by a variety of different drive mechanisms, and return on the bottom surface of the conveyor. The belts on curved conveyors are propelled in a similar fashion. However, propelling a continuous belt around a curved section is more complicated than a straight section. This difficulty is exacerbated in a curved conveyor since it is commonly desirable that the curved section(s) be of a small radius, so as to be able to turn at almost a right angle in a confined space.

Curved conveyor belts are therefore typically driven through the use of a linked drive chain, a linkless drive chain, or a drive belt, each of which has an endless loop configuration, and which is driven by an electric motor. The most common way to drive a curved conveyor belt is through the use of a linked drive chain, wherein the drive chain is in the form of a continuous loop, as is the conveyor belt, and is disposed at the outer edge of the conveyor belt or along the middle of the conveyor belt and wherein the drive chain directly drives the conveyor belt. An example of this type of drive mechanism is described in U.S. Pat. No. 6,105,755.

However, these linked drive chain systems can be difficult to operate and maintain, and can require constant adjustment. Also, cleaning of the drive system, when required, can be difficult.

Another method of driving a curved conveyor belt, and more specifically a continuous and unbroken type curved conveyor belt, is to have a portion of the conveyor belt pinched between an external drive wheel and an opposed idler wheel that is spring biased against the drive wheel. As the drive wheel turns, frictional forces are used to drive the conveyor belt. Examples of these types of systems are described in U.S. Pat. Nos. 5,839,570, 5,944,171, 6,564,931, 7,676,741 and 8,167,121.

However, this type of drive mechanism often does not work well because the drive belt is typically driven at only one point along the belt, and the contact between the belt and the drive wheel is by way of friction only. Heavy articles can therefore cause the conveyor belt to slip or lose engagement. Further, where articles such as food products are being conveyed, oils or the like, can become deposited on the conveyor belt, which can potentially cause reduced friction between the drive wheel and the conveyor belt, and causing the belt to slip.

Another drive option is the use of powered rollers or gears which rotate in a plane essentially perpendicular to the belt in order to propel various projections, followers, or linkages, which have been placed on the belt. These types of systems are described in, for example, U.S. Pat. Nos. 4,433,777, 6,843,366 and 8,113,339.

However, prior art attempts to use this approach rely on the use of drive gears configured to rotate in an arrangement wherein the plane of the gear is perpendicular to the belt surface. As such, the gears of these prior art devices are in a plane essentially perpendicular to the plane of the conveyor belt, and thus, the gears have an axis of rotation which is essentially parallel to the belt surface, and, which is also essentially transverse to the belt travel direction.

This type of drive gear is often located at an end of the belt so that the belt loops around the drive gear, but this limits the size of the conveyor belts' end return. For example, a drive gear end roller having a 7.5 cm diameter would cause a significant cleft at the end of the conveyor, where the curved conveyor meets another conveyor. It is highly desirable to minimize such clefts in order to facilitate the smooth transfer of articles from one conveyor to the next conveyor, especially for easily damaged articles. It is therefore preferable to have the end rollers of a curved conveyor as small a diameter as possible, perhaps about 1.5 cm, or even less, which is difficult to accomplish by presently known conveyor systems having a geared end roller which drives the conveyor belt.

Alternatively, the conveyor belt can be driven by a perpendicular gear positioned in the middle of the belt. The perpendicular gear can contact either the top or bottom belt surfaces, but in a preferred approach, the perpendicular gear can be arranged so as to simultaneously contact both the upper and lower belt surfaces. As such, a single gear can simultaneously drive the upper belt in one direction, and the lower belt in an opposite direction.

However, it is essential that constant contact with the perpendicular drive gear be maintained in order to avoid slippage of the belt. In order to facilitate proper meshing of the drive gear and the followers on the belt, the belt must therefore be kept in tension so as to avoid upward (or downward) movement of the belt that would allow the gears to become disengaged with the projections or drive linkages on the belt.

In order to keep the conveyor belt uniformly in tension, and particularly, when employing a curved conveyor, the curved conveyor belt must be manufactured to close tolerances and kept in tension during use, which can be both is difficult and expensive. Moreover, conveyor belts will stretch over time, under such tension, and therefore require frequent adjustment or replacement. As such, this approach is generally undesirable.

It would therefore be advantageous to provide a conveyor belt drive system, and in particular, a curved conveyor belt drive system, which overcame or ameliorated at least one of the problems of the prior art devices and systems. It would further be advantageous to provide a conveyor belt system, and preferably a curved conveyor belt system, which preferably was economical to manufacture, install, adjust, service and/or maintain.

SUMMARY OF THE INVENTION

In accordance with one aspect of the present invention, a conveyor system is provided, which comprises:

a continuous looped conveyor belt having first and second opposite ends, and having first and second direction reversing members disposed at the first and second opposite ends, respectively, so as to create a first conveyor belt portion travelling in one direction, and a second conveyor belt portion travelling in essentially the opposite direction, and wherein each of the first and second conveyor belt portions has an upper surface, and a lower surface;

a series of regularly spaced followers on said belt, which followers are attached to the belt;

a conveyor belt drive mechanism comprising at least one rotational drive member which is positioned in, and which rotates in, a plane which is spaced apart from, but parallel to, the upper or lower surfaces of said first or second conveyor belt portions;

wherein said rotational drive member includes a series of openings, to create teeth on the drive member, and when rotated, said teeth releaseably engage with said followers on said belt; and wherein rotation of said drive member continually causes at least one tooth from the drive member teeth to at least partially engage at least one follower, and move said follower in the direction of the belt travel, and thereby, propels the conveyor belt by rotation of said rotational drive member.

In more detail, the conveyor system is a straight or curved conveyor section comprising a continuous looped conveyor belt having first and second opposite ends, and having first and second direction reversing members disposed at the first and second opposite ends, respectively. By reversing the belt movement at the first and second opposite ends, the conveyor section has a first conveyor belt portion travelling in one direction, and a second conveyor belt portion travelling in essentially the opposite direction. Each of the first and second conveyor belt portions has an upper surface, and a lower surface.

Along at least one side of said continuous loop conveyor belt, or in the middle of the belt, are a series of regularly spaced followers, which followers are attached to the belt. In a preferred option, followers are provided on both the upper and lower surface of the belt, and still more preferably, the followers on the upper surface and the lower surface, are connected one to the other, by connectors. These connectors preferably extend through the belt.

A conveyor belt drive mechanism is also provided which comprises at least one rotational drive member which drive member rotates in a plane spaced apart from, but parallel to, either or both of the upper and/or lower surface of either or both of said first or second conveyor belt portions. The drive mechanism has an axis of rotation which is essentially perpendicular to the surface of the conveyor belt.

The drive member is positioned in, and also rotates in, a plane which is parallel to the belt surface.

The drive member includes a series of openings, to create "teeth" on the drive member, and when rotated, these teeth releaseably engage with the followers. Rotation of said drive member thus continually causes at least one tooth from the drive member to at least partially engage at least one follower, and move said follower in the direction of the belt travel. By use of this motive force, the drive member propels the conveyor belt.

In a preferred approach, the size and pitch of the openings and teeth on the drive member does not need to exactly match the size and shape of the followers. This provides some latitude in the shape, size and placement of the followers, and also ensures that the followers easily fit within the openings on the drive member.

A drive motor, and preferably, an electric drive motor, is used to cause rotation of the drive member, optionally through a drive mechanism. The drive mechanism can include various devices for connecting the drive motor to the rotational drive member, and these devices can include various motion transmission devices including, belts, gears, chains, cables or the like.

In one embodiment, the rotational drive member is a gear which gear is designed to correlate with gear shaped followers on the conveyor belt, or with a strip of gear teeth on the conveyor belt, in order to preferably form two related gear shaped members on both the belt and the drive member.

Preferably, the gear shaped members on the belt and on the drive member, are connected one to the other, with an involute profile.

In a preferred approach, however, the rotational drive member is a circular sprocket which includes openings and teeth along its edge which openings and teeth are adapted to correlate to followers, and the spaces between the followers, on the conveyor belt. The followers are preferably circular in shape, although any suitable shape might be used. For example, wedge-shaped followers could be used, which have a narrow edge directed towards the drive member. However, any suitably shaped follower can be utilized provided it can releaseably engage with the drive member.

In a particularly preferred embodiment, wherein the drive mechanism includes two spaced apart, but parallel rotational drive members, which rotational drive members are adapted to be located in a plane parallel to, and adjacent the upper and lower surfaces of either of the first or second conveyor belt portions, whereby either of the first or second conveyor belt portion, is positioned between the spaced apart, but parallel rotational drive members, and wherein each of the drive members are simultaneously, and continually operatively connected to at least one follower on the upper and lower surfaces of the first or second conveyor belt portions.

In an even more preferred embodiment, two sets of spaced apart, but parallel drive members are provided, wherein a first set of spaced apart, but parallel drive members is operatively connected to followers on the upper and lower surfaces of the first conveyor belt portion, and a second set of spaced apart, but parallel drive members is operatively connected to followers on the upper and lower surfaces of the second conveyor belt portion. The parallel drive members rotate in opposite directions, so that, in this approach, both the first and the second conveyor belt portions are driven in opposite directions.

The first and second sets of spaced apart, but parallel drive members, can be driven by separate drive motors, or can be driven by a single drive motor connected to both sets of drive members, using any suitable connection devices. Again, this can include various interconnecting transmission devices including, belts, gears, chains, cables or the like.

While the drive members can be located above, below, and/or between the first and second conveyor belt portions, the drive members and/or mechanisms, are preferably located on one side of the conveyor belt, between the first and second opposite ends, and typically located on the same side of the conveyor belt, as the followers. A single drive member or mechanism can be provided, or multiple drive members and mechanisms can be included at various locations on the side of the conveyor belt.

Further, followers can be provided on both sides of the conveyor belt, and drive members and mechanisms can be provided on both sides of the conveyor belt. For long, straight conveyor belt applications, multiple drive members and mechanisms can be provided, and these can be preferably provided on both sides of the conveyor belt.

For a curved conveyor, wherein the conveyor belt has a radially inward side, and a larger radius, radially outward side, the followers and the drive member(s) and mechanism(s) are preferably located on the radially outward side. The use of followers and drive member(s) and mechanism(s) on the radially inward side, in place of, or in addition to, drive member(s) and mechanism(s) on the radially outward side, is not excluded, however.

Followers are typically provided on one side of the belt, but can be provided on both sides of the belt. Further, followers can be provided in the middle of the conveyor belt, but this is not typically preferred since this approach may interfere with placement of product on the conveyor belt.

When the followers are located on the side of the belt, the system provides an edge drive system which preferably has a low profile since, only the thickness of a part of one sprocket, the followers, and optionally slots or grooves for the followers (see below), are located above the belt.

In a preferred option, the followers are covered by a cover assembly which protects the followers. The cover assembly also preferably includes a slot or groove in which the followers move as the belt moves. This slot or groove preferably also acts as a guide which aids in keeping the followers and belt in place as the belt moves. More importantly, however, the slot or groove in the cover assembly aids in maintaining the followers in a proper position for engagement with the drive member or drive members.

Again, this still provides a low profile drive system since the cover assembly can be appropriately sized so as to only cover the followers.

The drive member is driven by a drive mechanism which is preferably mounted on a moveable support assembly, so that it can be moved to a position wherein it is not in contact with the conveyor belt or the conveyor belt followers. This can be achieved by, for example, using a pivoting support assembly, or by a translatory motion support system, which allows the drive member(s) and mechanism(s) to be easily moved away from the conveyor belt in order to facilitate cleaning, repair or replacement of the belt or the drive member(s) or mechanism(s). The translatory motion can be achieved using a sliding system, or slots, and pivoting can be provided by a pivot pin or by hinge attachment mechanism, or the like. Moving the drive mechanism also facilitates cleaning, repair, removal or replacement of the belt assembly, drive members, and/or drive mechanisms, when required.

It should also be noted that since the drive member rotates in the same plane as the movement of the belt, there is no need for excessive tension on the belt. The belt can be maintained in position by using minimal tension provided by, for example, spring biased rollers or pulleys which can be used as reversing members at the first and/or second opposite ends of the conveyor belt. If required, a groove can be provided on the reversing members to allow the followers to more easily rotate around the reversing members.

Also, since the drive mechanism(s) is preferably located away from the reversing members, the size of the reversing members can be relatively small in diameter. Provided that the followers are able to rotate around the reversing members, the diameter of the reversing members can be reduced as much as desired depending on the size of the followers. As a result, the cleft between adjacent conveyor belts can be minimized.

Use of small diameter nosebars, and the like, for reversing the direction of the belt, is also not precluded, and this can further reduce the cleft size between adjacent conveyor belt assemblies.

In the practise of the present invention, it will be noted that he preferred conveyor systems are generally flat, horizontally disposed, conveyor systems. However, use of inclined conveyor systems, or inclined conveyor system sections, is not excluded.

Moreover, the approach of the present invention is particularly well adapted for use in a curved conveyor, and thus, a particularly preferred conveyor system is a curved conveyor system.

BRIEF DESCRIPTION OF THE DRAWINGS

Embodiments of this invention will now be described by way of example only in association with the accompanying drawings in which:

FIG. 2 is a top plan view of a conveyor drive system of the present invention, on a curved conveyor;

FIG. 3 is a side view of a part of the drive system of the present invention, on a curved conveyor;

DETAILED DESCRIPTION OF THE PREFERRED EMBODIMENTS

Figure 1:
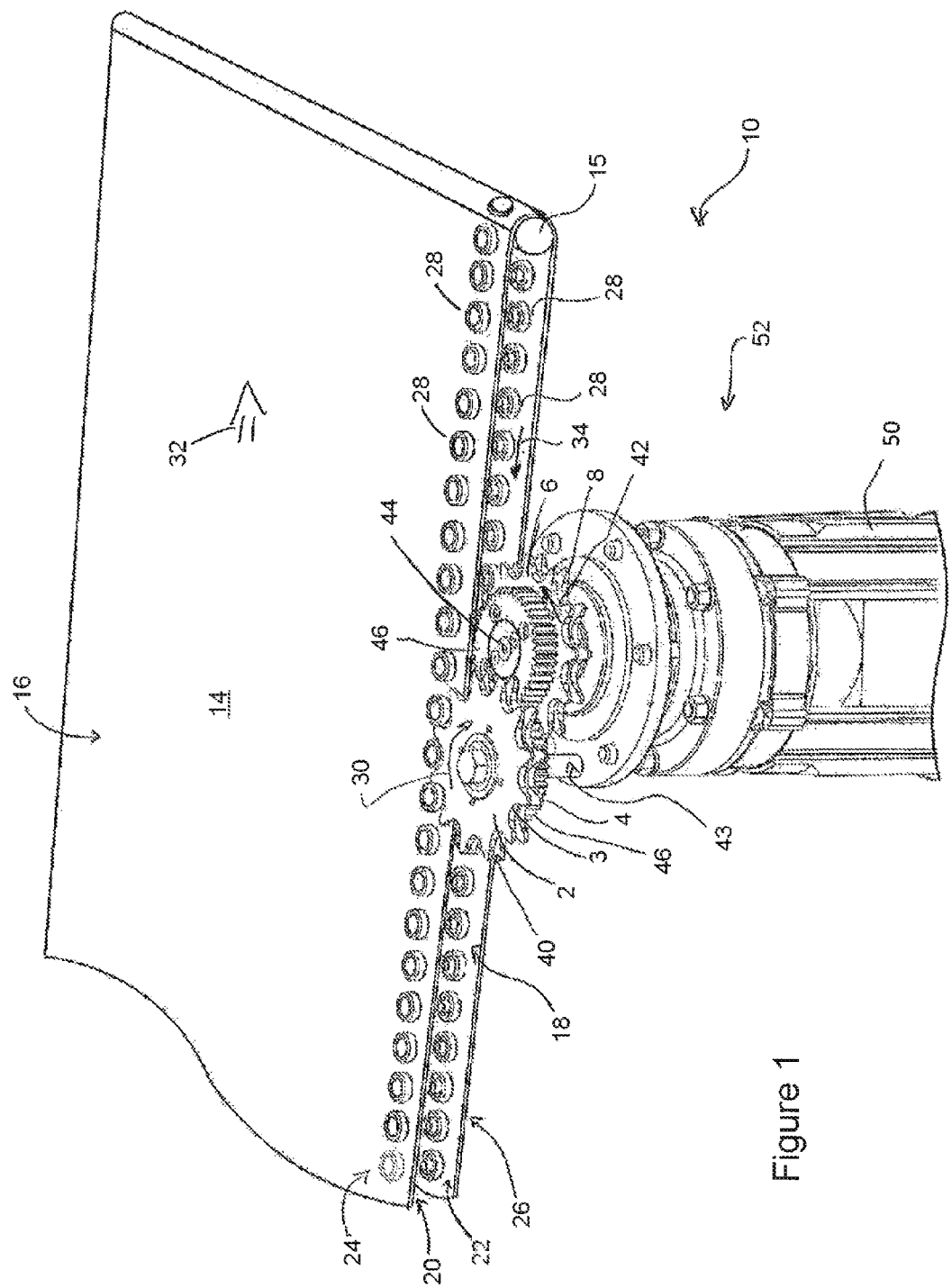
FIG. 1 is a perspective view of a conveyor drive system of the present invention, on a straight conveyor.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Referring to FIG. 1, a conveyor system 10 is shown, in accordance with the present invention, and which includes a perpendicular drive arrangement. Conveyor system 10 includes a straight conveyor belt 14, having an upper portion 16 and a lower portion 18. Each of upper portion 16 and lower portion 18 include interior surfaces 20 and 22 respectively, and exterior surfaces 24 and 26 respectively. A support bed (not shown), or alternatively, support rollers, is positioned under at least a portion of upper portion 16 of belt 14, in order to support the belt, and the goods placed on belt 14. Belt 14 slides along the support bed or rollers, as it travels from one end to the opposite end.

Belt 14 is preferably a continuous loop conveyor belt mounted on a belt support bed in looped relation around the direction reversing, end pulleys 15, so as to have an article carrying portion disposed above the belt support bed and a return portion disposed below the belt support bed, thus defining a looped path for the conveyor belt and presenting a substantially horizontal article carrying top surface.

Belt 14 can be made of any suitable material, but typically is a woven fabric material that provides sufficient strength for use as a conveyor belt, and can be covered with a flexible urethane coating material, or with, for example, a material with rubbery properties. The thickness and width of the conveyor belt can also vary depending on the selected application.

At each end of conveyor system 10 is a direction reversing, end pulley 15, around which conveyor belt 14 travels. Typically, similar pulleys 15 are located at both ends of the conveyor system, although different sized pulleys can be utilized at opposite ends of the conveyor system.

A series of regularly spaced followers 28 are provided on belt 14 and extend through belt 14 so as to be on both the interior surfaces 20 and 22, and the exterior surfaces 24 and 26, of the upper portion 16 and lower portion 18 of belt 14.

In a preferred approach, followers 28 are two circular discs placed on each surface of belt 14, and a connector, such as a rivet, screw, nut and bolt, or the like, is used to puncture, or pass through, belt 14, and hold the circular discs together. Moreover, these circular discs, preferably can rotate, or spin around the connector, independent of one another, and therefore, are not stationary on the moving belt 14. This doesn't exclude, however, the option where the two circular discs are locked together, and/or locked to the belt.

Conveyor system 10 includes a drive sprocket 2 which is essentially parallel to, but spaced apart from, the exterior surface 24 of the upper portion 16 of belt 14. Sprocket 2 includes openings 3 adapted to relaseably engage circular followers 28 on exterior surface 24.

In a preferred embodiment, system 10 further includes a second, identical drive sprocket 4, parallel to sprocket 2, but which is spaced apart from sprocket 2, and positioned to releasably engage followers 28 on interior surface 20 of the upper portion 16 of belt 14. As such, sprockets 2 and 4 will releasably engage followers 28 on the interior 20 and exterior 24 surfaces of the upper portion 16 of belt 14. It will be noted that sprockets 2 and 4 are essentially parallel one to the other, and form a gap 40 between them. Gap 40 is sufficiently large to allow belt 14 to be positioned therein.

Both sprockets 2 and 4 rotate at the same rate, and in the same direction. As such, sprockets 2 and 4 are preferably mounted on a shared drive shaft 43.

In a further preferment, additional sprockets 6 and 8 are provided which are parallel to, but slightly spaced apart from, the interior 22 and exterior 26 surfaces of lower portion 18 of belt 14. These sprockets 6 and 8 are also essentially parallel, one to the other, and releasably engage followers 28 on lower portion 18. A gap 42 is created between sprockets 6 and 8 and the gap 42 is also sufficiently large to allow belt 14 to be positioned therein.

Sprockets 6 and 8 rotate in the same direction, but this direction is opposite to the rotation direction of sprockets 2 and 4. Sprockets 6 and 8 can also be mounted on a shared drive shaft 44. Drive shafts 43 and 44 can be connected to different motors, but preferably, a single motor 50 is used, and drive shafts 44 and thus, shaft 43 are linked together using, for example, a reversing gear 46 that causes drive shafts 43 and 44 to rotate in opposite directions. As a result, in this embodiment, drive shafts 43 and 44 are offset one from the other.

Rotation of motor 50 causes sprockets 2 and 4 to rotate in the direction indicated by arrow 30, and sprockets 6 and 8 to rotate in the opposite direction. As such, rotation of motor 50 simultaneously propels upper portion 16 of belt 14 in one direction of travel (shown by arrow 32), and lower portion 18 of belt 14 to travel in an opposite direction (as shown by arrow 34).

Drive motor 50 is preferably an AC or DC electric motor, although other drive mechanisms, such as hydraulic or pneumatic drive systems are not excluded.

Motor 50 can be directly connected to drive shaft 44, and directly effect rotation of sprockets 2 and 4. However, a drive mechanism including the use of gears, belts, chains, cables or the like, to connect motor 50 to drive shaft 44, can also be included.

In a preferred approach, each of sprockets 2, 4, 6 and 8 have the same size and have the same opening size and shape. As such, each sprocket is essentially identical, and are equally adapted to releaseably engage followers 28. Moreover, sprockets 2 and 4 preferably simultaneously releasably engage the same followers 28 at the same time, on the interior 20 and exterior 24 surfaces of the upper portion 16 of belt 14. This results in a balanced force being applied to the followers, across the thickness of the belt.

Similarly, sprockets 6 and 8 also preferably simultaneously releasably engage the same followers 28 at the same time, on the interior 22 and exterior 26 surfaces of the upper portion 18 of belt 14.

In normal operation, at least one tooth of sprockets 2 and 4, and/or 6 and 8, at least partially engages one of followers 28 at any given time. Preferably, all of sprockets 2, 4, 6 and 8 have at least one tooth in at least partial engagement with followers 28 at any given time, so that, at any given time, a motive force to move belt 14 is provided.

It can also be seen that motor 50, drive shafts 42 and 44, gear 46, and sprockets 2, 4, 6 and 8, are mounted as a complete drive system 52, which drive system 52 can be slidably or pivotably mounted to a support frame. Using this approach, the complete drive system 52 can be moved away from belt 14 to allow cleaning, servicing, maintaining, replacement of belt 14, and/or drive system 52.

It will also be understood by the skilled artisan, that additional conveyor drive systems 52 can be used on the same conveyor belt 14, and these can be placed at different locations along the length of the conveyor belt. Additionally, if followers 28 are positioned on each side of belt 14, additional conveyor drive systems 52 can be positioned on each side of belt 14.

Figure 4:
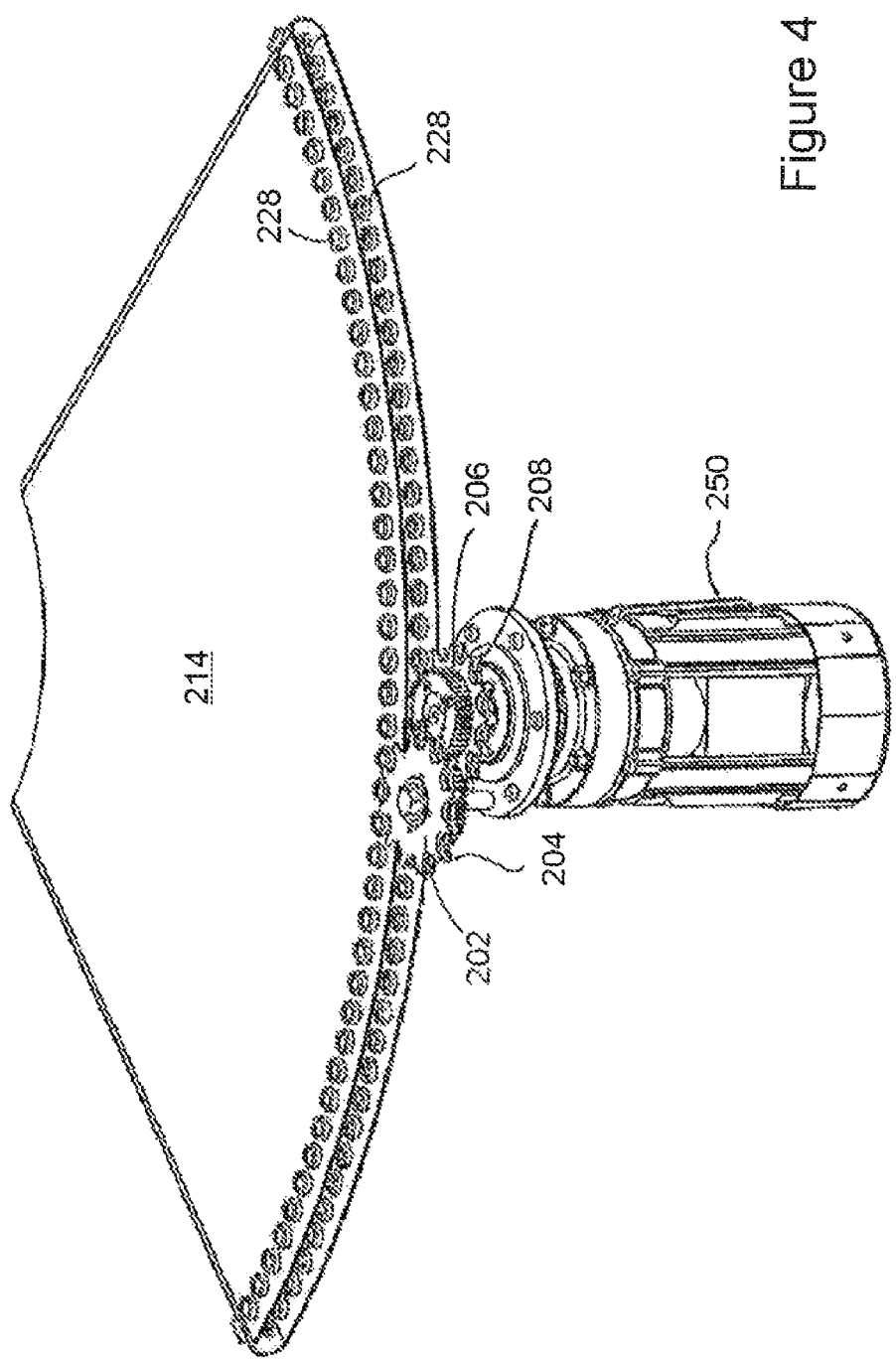
FIG. 4 is a top perspective view of the drive system of FIG. 3.

In FIGS. 2 to 4, a further embodiment of the conveyor system 200 of the present invention is shown. It will be noted that the present invention is of particular use in curved conveyor applications, and as such, in this embodiment, a curved conveyor is provided. In curved conveyor system 200, conveyor belt 214 is used which is similar to belt 14 in FIG. 1, with the exception that conveyor belt 214 is now curved.

In FIG. 2, a top plan view of a curved conveyor of the present invention is shown. In FIG. 3, a cross-sectional side view of the curved conveyor system is shown, and in FIG. 4, a perspective view of various components of the curved conveyor system is shown in more detail.

In FIG. 2, curved conveyor system 200 includes a wedge shaped conveyor belt 214, which has an inner radius and a larger outer radius, and which is used to effect a curve of 90°. Other angles can be provided, but typically, the selected angel for typical conveyor system is between 15° and 180°. Typically, standard angles such as 30°, 45°, 60°, 90°, 135° or virtually any other desired angle, can be provided. Angles greater than 180° can also be provided, where needed, by combining two or more curved conveyors.

Also, it will be clear that various angles can be provided by using a series of curved conveyors which can be abutted one to another in order to obtain a desired degree of curvature.

At opposite ends of conveyor system 200 are end pulleys 215 around which conveyor belt 214 travels. End pulleys 215 can be of a constant diameter, or can be tapered, where desired, as is known in the curved conveyor art. Also, end pulleys 215 can be segmented rollers consisting of 2 or more rotating parts.

End pulleys 215 do not need to be in tension with belt 214. However, in a preferred embodiment, either or both of end pulleys 215 can be spring-mounted so as to provide some tension on the curved conveyor belt 214. This assists in maintaining belt 214 in a pre-set position when in motion.

Belt 214 is preferably a continuous loop conveyor belt which has arcuate inner and outer edges with a common, substantially vertical, centre axis at or near the arcuate inner edge. The arcuate inner edge could even have a zero or near-zero radius, if desired.

Belt 214 is preferably mounted on belt support bed 217, in looped relation around the end pulleys 215 so as to provide an article carrying portion which is disposed above the belt support bed and a return portion disposed below the belt support bed. This defines a looped path for the conveyor belt 214 and provides a substantially horizontal article-carrying top surface.

Followers 228 are positioned on the arcuate edge of the outer radius of conveyor belt 214, as is drive system 252. While a further drive system 252 could be positioned on the inner radius of conveyor belt 214, it is typically preferred that drive system 252 be positioned on the outer radius. Multiple drive systems 252 could also be used at various positions, as was described hereinabove, with respect to FIG. 1.

As seen in FIG. 3, sprockets 202 and 204 are provided on drive shaft 243, and sprockets 206 and 208 are provided on drive shaft 244. A gap 240 is provided between sprockets 202 and 204, and a second gap 244 is provided between sprockets 206 and 208. Belt 214 fits within gaps 240 and 242.

Drive shaft 244 is connected to motor 250, and drive shaft 244 is connected to drive shaft 243 by use of a reversing gear set 246. When motor 250 is activated, sprockets 206 and 208 rotate in a first direction, while sprockets 202 and 204 rotate in the opposite direction. As a result of the rotation of sprockets 202, 204, 206 and 208, a motive force is simultaneously applied to followers 228 on the interior and exterior surfaces of both upper belt portion 216 and lower belt portion 218. As a result of this motive force on followers 228, belt 214 is moved in the direction shown by the arrow on belt 214.

In FIG. 4, additional overall details are shown in a perspective view of the curved conveyor system of the present invention.

Figure 5:
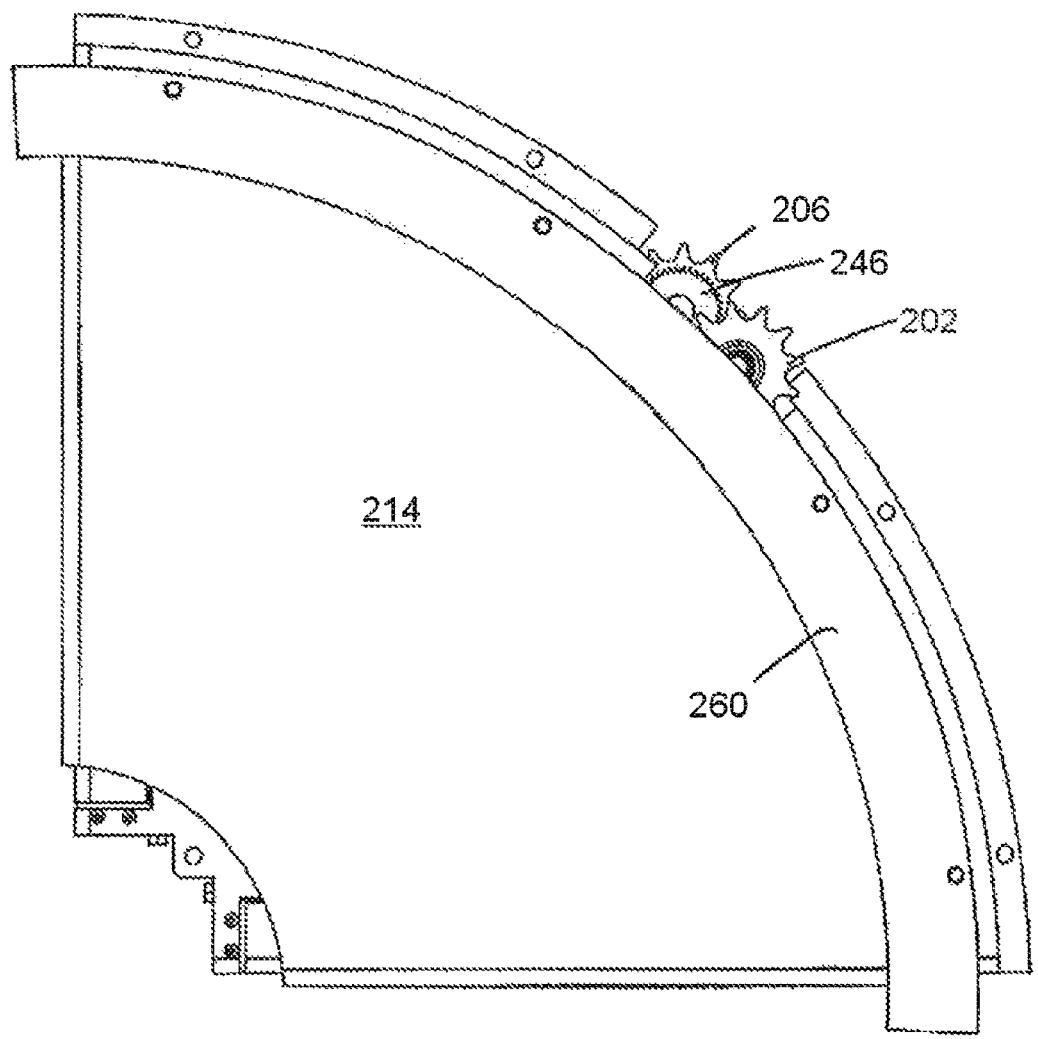
FIG. 5 is a top plan view of the drive system of the present invention in use on a curved conveyor, with guideways.

It is to be noted that it is important for followers 28 or 228 to be held in contact with the various sprockets. As such, guideways are preferably provided to keep followers 28 or 228 in their normal location. In FIG. 5, a top plan view of the conveyor system 200 of FIGS. 2 to 4 is shown, which additionally includes a cover assembly as a guideway 260 for followers 228. Guideway 260 also covers, and thus, protects followers 228 from inadvertent contact.

Figure 6:
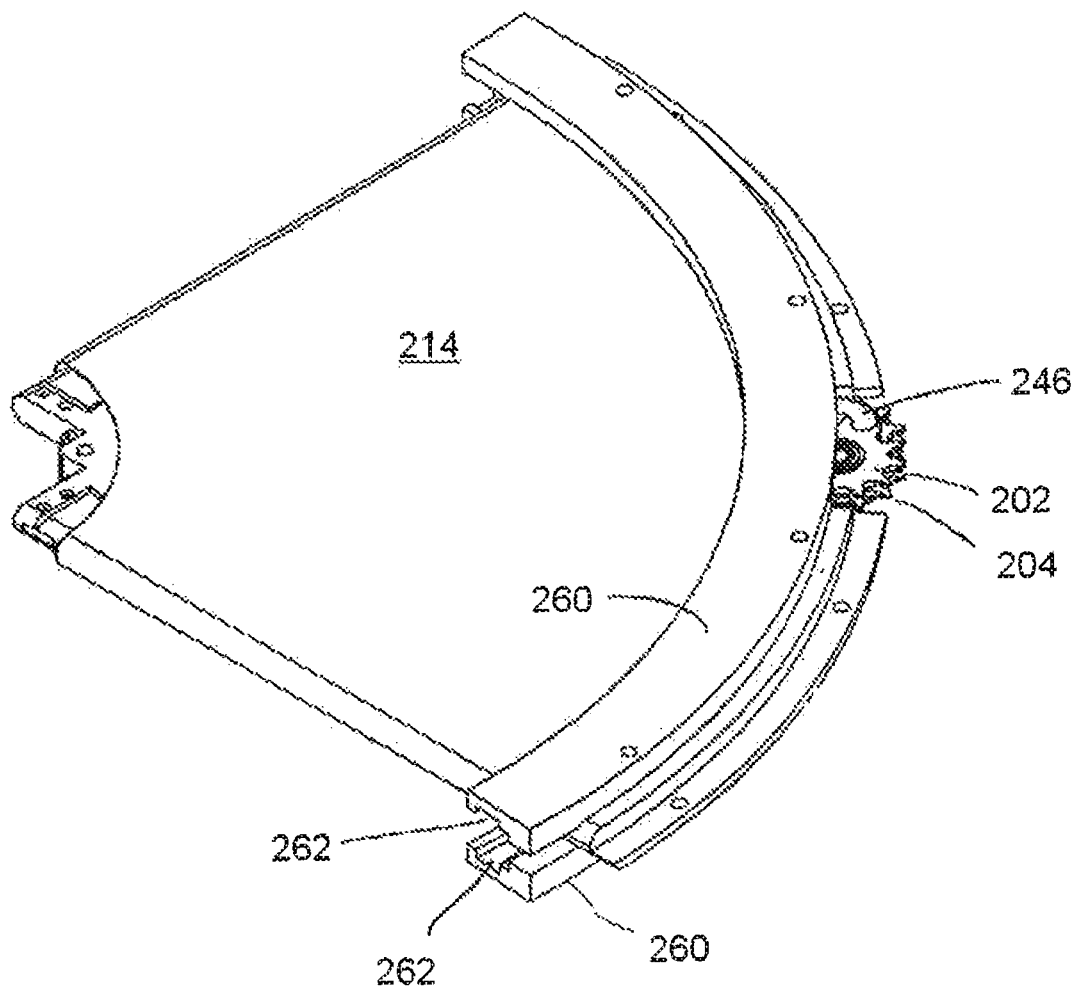
FIG. 6 is a perspective view of a curved conveyor of FIG. 5.

In a preferred embodiment, two similarly shaped guideways 260 are provided;—one on each of the exterior sections of the top and bottom portions of belt 214. A perspective view of this arrangement is shown in FIG. 6.

Figure 7:
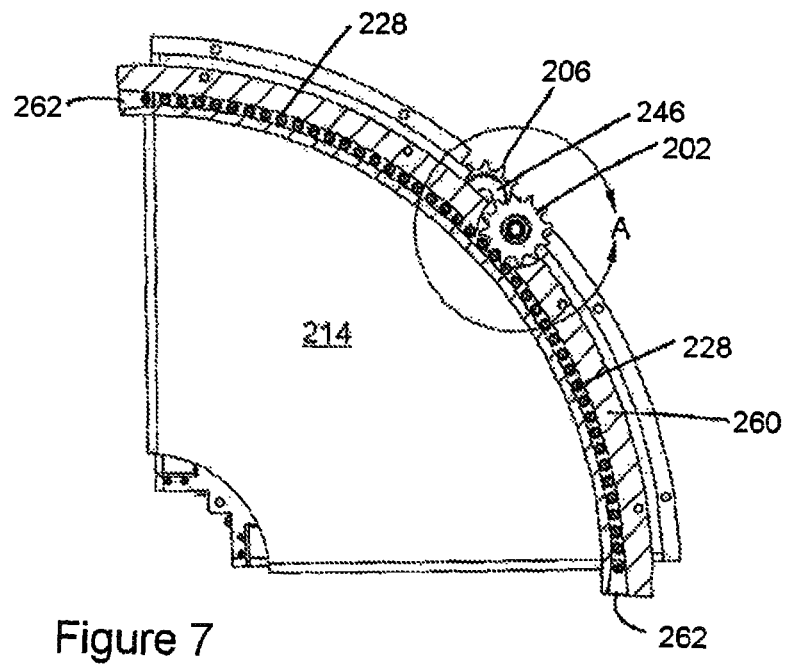
FIG. 7 is a partial cross-sectional view of the curved conveyor of FIG. 5.

A cross-sectional view wherein the a portion of the top part of guideway 260 has been removed, is shown in FIG. 7. It can be observed that guideway 260 includes a slot 262 on the underside of guideway 260, which provides a pathway for followers 228 to travel in, as conveyor belt 214 moves. For a curved conveyor, slot 262 is preferably an arcuate slot having a constant radius, so that followers 228 are maintained within slots 262 as belt 214 travels around the curved conveyor system. Guideway 260 therefore also assists in ensuring proper alignment of the followers 228 and the sprockets, and holding belt 214 in its correct position.

Slots 262 preferably have a width which is slightly greater than the diameter of followers 228 so as to minimize friction as the followers move through the slot. Slot 262 could additionally be lubricated to reduce friction, or could be coated with a material (e.g. Teflon ™ or the like) to minimize friction.

Figure 8:
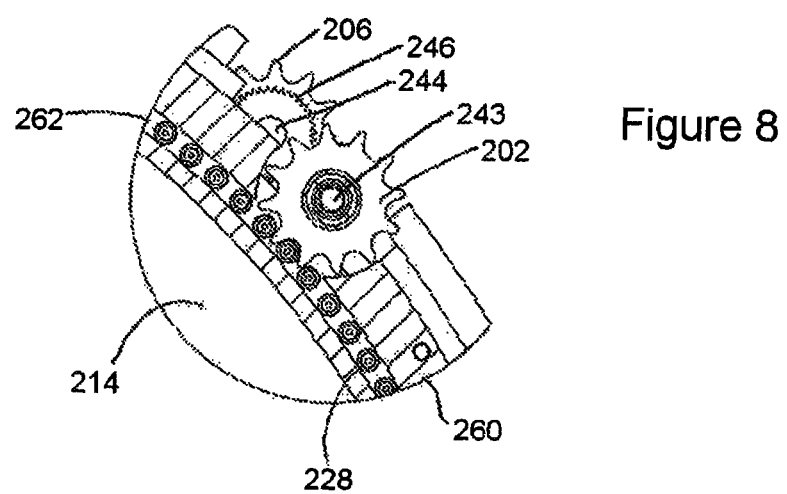
FIG. 8 is an enlarged view of a portion of the curved conveyor shown in FIG. 7.

FIG. 8 shows an enlarged view of the guideway 260 and slot 262 in the area "A" from FIG. 7, showing further details of slot 262 in guideway 260, and further details of sprockets 202 and 206, drive shafts 243 and 244, and reversing gear 246.

It will of course, be noted that a similar arrangement can be provided on a straight conveyor, as shown in FIG. 1, wherein guideways and slots can also be provided. In this embodiment, though, the slots in the guideways will be straight.

The guideways can cover the entire length of the conveyor, or can be used to cover the followers only in the area near the sprockets. Preferably, the guideways cover the followers for most, if not all, of the length of the conveyor.

Figure 9:
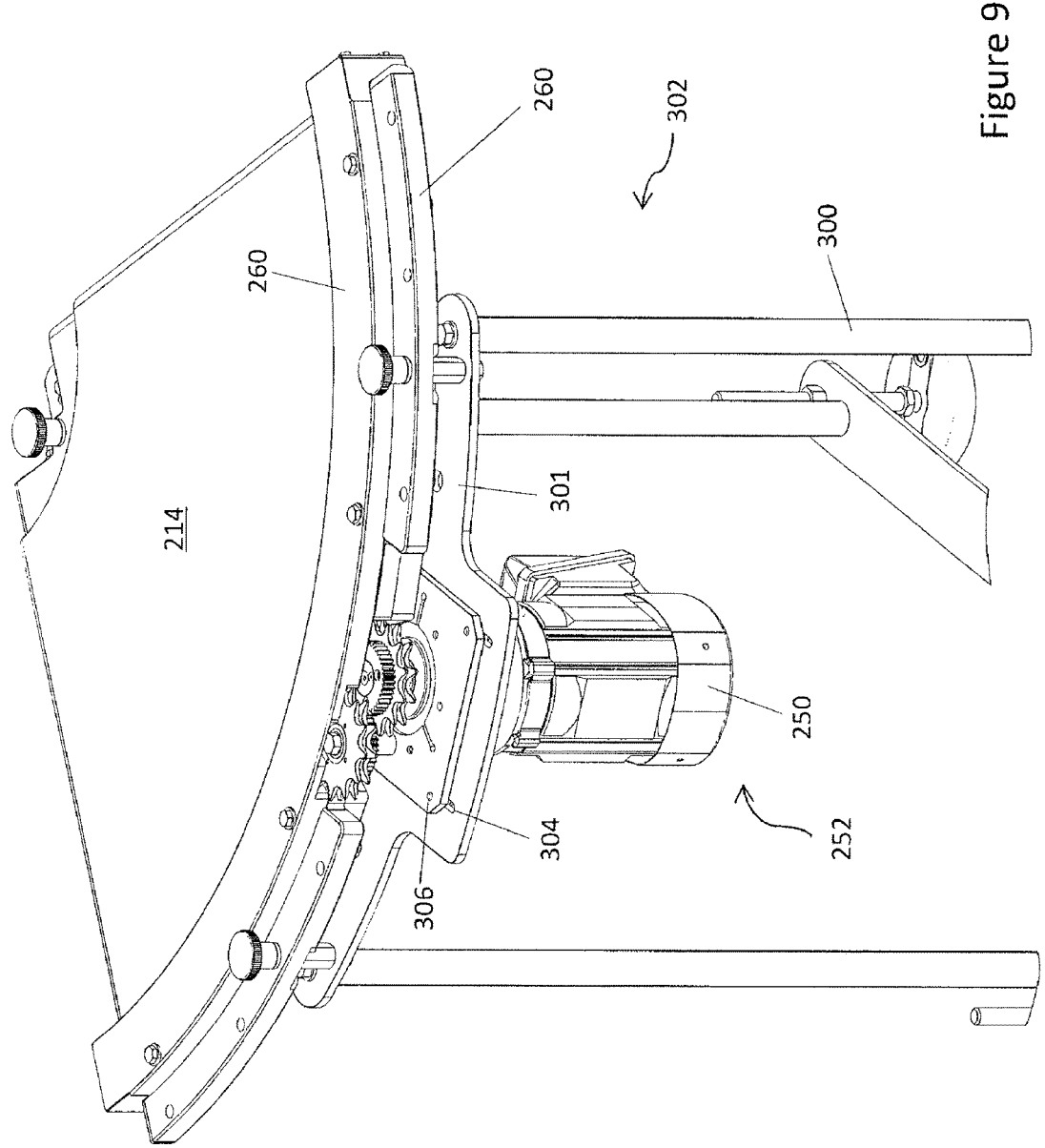
FIG. 9 is a top perspective view of a complete curved conveyor assembly on a support structure.

Conveyor section 200 can be mounted on a support structure 300, as shown in FIG. 9, and this entire 90° corner assembly 302 can be positioned at any suitable location in a complete conveyor apparatus. In the example shown in FIG. 9, the assembly 302 can be placed anywhere a 90° turn is required.

For smaller curve sections, or for curved conveyors transporting light objects, only one conveyor drive mechanism 252 is typically required. However, it will be clear that additional drive mechanisms can be provided at different locations on the outer or inner edges of the conveyor belt 214. Drive mechanism 252 is mounted on a plate 301, which is part of support 300.

It can also be seen that slots 304 are provided in plate 301 in which mounting bolts 306 are fitted to hold drive mechanism 252 in place. By loosening bolts 306, drive system 252, including motor 250, can be moved away from belt 214, and thus, belt 214 and/or drive system 252 can be easily cleaned, repaired or replaced. Moreover, once drive system 252, and top and bottom guideways 260, have been moved, the entire bed section assembly 216, including bed section 217, end pulley rollers 215, and belt 214, and the like, can be easily removed as an entire assembly, by removing additional bed holding bolts, or the like, and then quickly replaced with a similar system. Thus, in one preferred option, the entire bed section assembly is removable, intact, and quickly replaced with a clean bed section, once the drive system has been removed.

The removed bed section assembly can then be thoroughly cleaned or repaired, before being returned to service.

Figure 10:
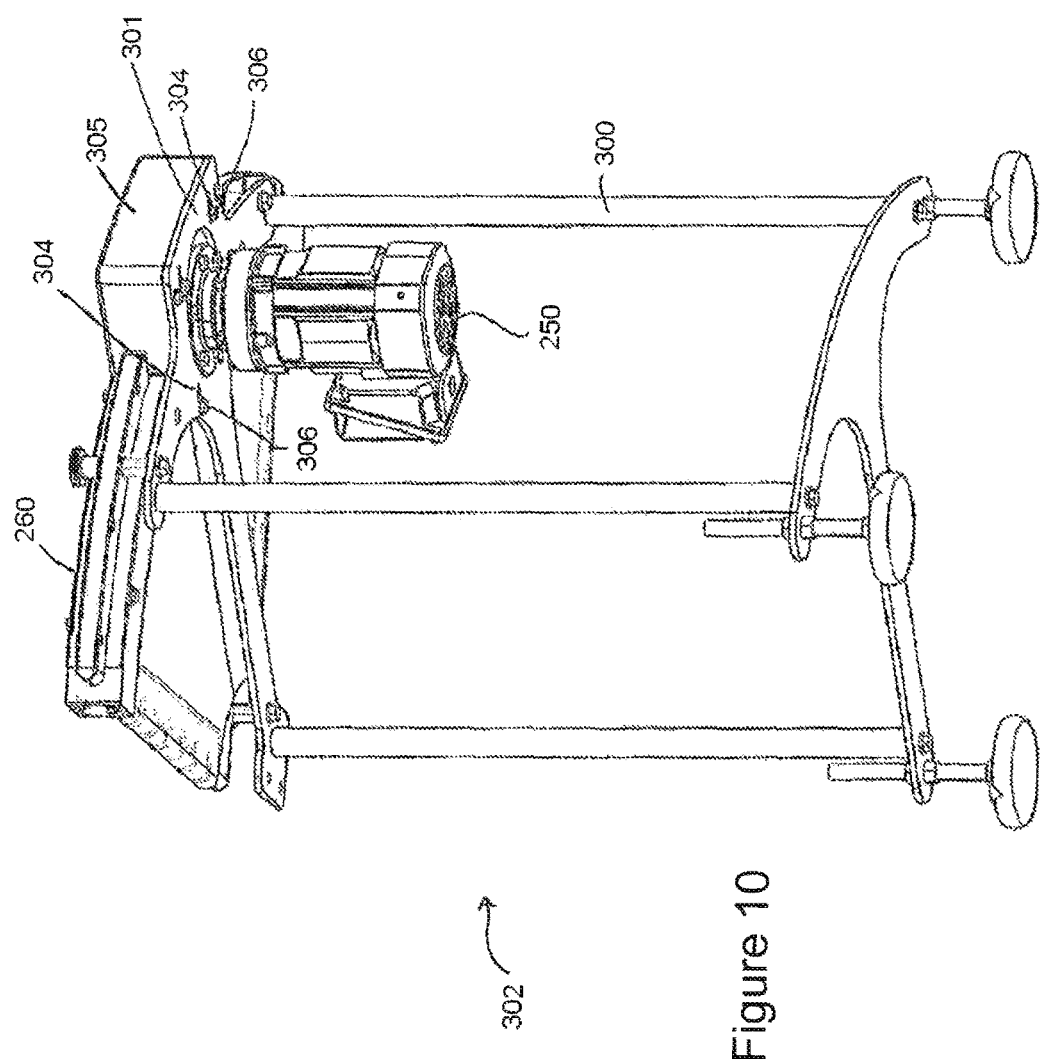
FIG. 10 is a further perspective view of a portion of the curved conveyor assembly of FIG. 9.

A lower perspective view of assembly 302 is shown in FIG. 10, which more clearly shows the mounting of drive system 252, and the use of slots 304 to allow drive system 252 to be moved on plate 301 of support structure 300. Also, it can be seen that a cover 305 can be used to cover the sprockets 202, 204, 206 and 208, and gear sets 246, in order to prevent damage to these components.

Figure 11:
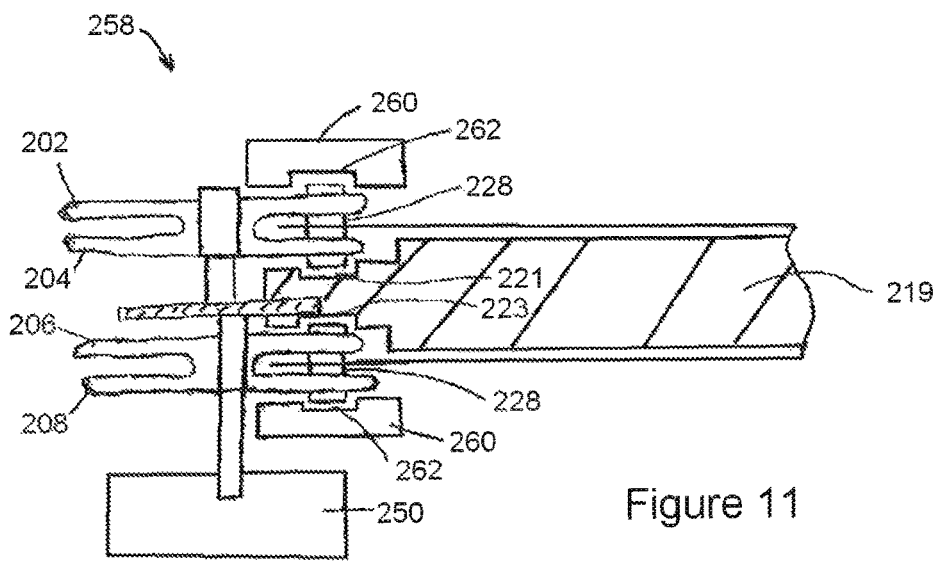
FIG. 11 is a side view of a further embodiment of the conveyor of the present invention.

It can also be noted that guideways are provided on the exterior sections of belt 214. However, additional guideways can also be included on the interior sections of belt 214 by providing a suitable slot in, for example, the belt support bed 217. In FIG. 11, a cutaway side view of a conveyor section 258, similar to FIG. 3 is shown, but including a preferred guide system design. Top and bottom guideways 260, with slots 262 are shown, as previously described. In this embodiment however, belt support bed 219 extends under followers 228. A top and bottom groove (221 and 223, respectively) are provided in belt support bed 219. Grooves 221 and 223 are cut into belt support bed 219, and provide a further guideway for followers 228.

For conveyor systems having light loads, or the like, a conveyor system can be provided having only one sprocket, or one set of sprockets. The single sprocket, or the single set of sprockets, can be placed on either the top belt portion or the lower belt portion.

Figure 12:
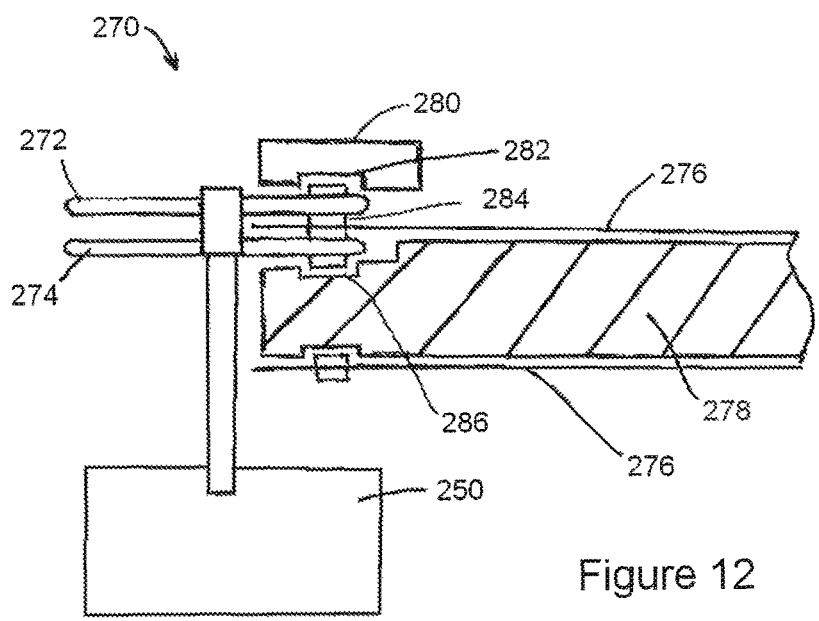
FIG. 12 is a side view of a still further embodiment of the present invention.

In FIG. 12, a cutaway cross-sectional view of a conveyor system 270 having a single set of sprockets 272 and 274. In this example, belt 276 rests on belt support bed 278. A single top guideway 280 is provided, having a groove 282 for followers 284. A groove 286 is cut into belt support bed 278, to act as a lower guideway for followers 284.

Thus, it is apparent that there has been provided, in accordance with the present invention, a conveyor belt drive system which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practised in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A conveyor system comprising:
a continuous looped conveyor belt having first and second opposite ends, and having first and second direction reversing members disposed at the first and second opposite ends, respectively, so as to create a first conveyor belt portion travelling in one direction, and a second conveyor belt portion travelling in essentially the opposite direction, and wherein each of the first and second conveyor belt portions has an upper surface, and a lower surface;
a series of regularly spaced followers on said belt, which followers are attached to said conveyor belt;
a conveyor belt drive mechanism comprising at least one rotational drive member which is positioned in, and which rotates in, a plane which is spaced apart from, but parallel to, the upper or lower surfaces of said first or second conveyor belt portions;
wherein said rotational drive member includes a series of openings, to create teeth on the drive member, and when rotated, said teeth releaseably engage with said followers on said belt;
wherein rotation of said drive member continually causes at least one tooth from the drive member teeth to at least partially engage at least one follower, and move said follower in the direction of the belt travel, and thereby, propels the conveyor belt by rotation of said rotational drive member, and
wherein said drive mechanism includes two spaced apart, but parallel rotational drive members, which rotational drive members are adapted to be located in a plane parallel to, and adjacent the upper and lower surfaces of either of the first or second conveyor belt portions, whereby either said first or second conveyor belt portion, is positioned between the spaced apart, but parallel rotational drive members, and wherein each of said drive members are simultaneously, and continually operatively connected to at least one follower on the upper and lower surfaces of the first or second conveyor belt portions.

2. A conveyor system as claimed in claim 1 wherein drive mechanism has an axis of rotation which is essentially perpendicular to the surface of the conveyor belt.

3. A conveyor system as claimed in claim 1 wherein drive member is positioned in a plane parallel to either of the upper or lower surface of either of said first or second conveyor belt portions.

4. A conveyor system as claimed in claim 1 wherein said drive member is rotated by a drive motor, optionally through a drive mechanism.

5. A conveyor system as claimed in claim 4 wherein said motor is an electric drive motor connected to said drive member through said drive mechanism, which drive mechanism comprises belts, gears, chains or cables.

6. A conveyor system as claimed in claim 1 wherein said rotational drive member is a circular sprocket having openings and teeth along its edge which openings and teeth are adapted to correlate to followers and the spaces between the followers, on the conveyor belt.

7. A conveyor system as claimed in claim 1 wherein followers are provided on both sides of the conveyor belt, and rotational drive members are provided on both sides of the conveyor belt.

8. A conveyor system as claimed in claim 1 wherein two sets of spaced apart, but parallel drive members are provided, wherein a first set of spaced apart, but parallel drive members is operatively connected to followers on the upper and lower surfaces of the first conveyor belt portion, and a second set of spaced apart, but parallel drive members is operatively connected to followers on the upper and lower surfaces of the second conveyor belt portion.

9. A conveyor system as claimed in claim 8 wherein the two sets of parallel drive members rotate in opposite directions, so that, the first and the second conveyor belt portions are driven in opposite directions.

10. A conveyor system as claimed in claim 9 wherein the first and second sets of spaced apart, but parallel drive members, are driven by a single drive motor connected to both sets of drive members.

11. A conveyor system as claimed in claim 1 wherein said drive mechanism is mounted on a moveable support assembly provided by a pivoting support assembly, or by a translatory motion support system, whereby it can be moved to a position wherein it is not in contact with the conveyor belt or the conveyor belt followers.

12. A conveyor system as claimed in claim 11 wherein said translatory motion support system is achieved by using a sliding system, or slots, and wherein said pivoting support assembly is achieved by using a pivot pin or by hinge attachment mechanism.

13. A conveyor system as claimed in claim 1 wherein the rotational drive member is a gear which gear is designed to correlate with gear shaped followers on the conveyor belt in order to form two related gear shaped members on the belt and the drive member.

14. A conveyor system as claimed in claim 13 wherein the gear shaped members on the belt and on the drive member, are connected one to the other, with an involute profile.

15. A conveyor system as claimed in claim 1 wherein said conveyor is a curved conveyor having a radially inward side, and a larger radius, radially outward side, and wherein the followers and the rotational drive member are located on the radially outward side.

16. A conveyor system comprising:
a continuous looped conveyor belt having first and second opposite ends, and having first and second direction reversing members disposed at the first and second opposite ends, respectively, so as to create a first conveyor belt portion travelling in one direction, and a second conveyor belt portion travelling in essentially the opposite direction, and wherein each of the first and second conveyor belt portions has an upper surface, and a lower surface;
a series of regularly spaced followers on said belt, which followers are attached to said conveyor belt;
a conveyor belt drive mechanism comprising at least one rotational drive member which is positioned in, and which rotates in, a plane which is spaced apart from, but parallel to, the upper or lower surfaces of said first or second conveyor belt portions;
wherein said rotational drive member includes a series of openings, to create teeth on the drive member, and when rotated, said teeth releaseably engage with said followers on said belt;
wherein rotation of said drive member continually causes at least one tooth from the drive member teeth to at least partially engage at least one follower, and move said follower in the direction of the belt travel, and thereby, propels the conveyor belt by rotation of said rotational drive member, and
wherein said followers travel in a cover assembly which cover assembly comprises a slot or groove in which the followers move as said belt moves, and wherein said slot or groove acts as a guide which aids in keeping the followers and belt in place as the belt moves, and aids in maintaining the followers in a proper position for engagement with the drive member or drive members.

17. A conveyor system comprising:
a continuous looped conveyor belt having first and second opposite ends, and having first and second direction reversing members disposed at the first and second opposite ends, respectively, so as to create a first conveyor belt portion travelling in one direction, and a second conveyor belt portion travelling in essentially the opposite direction, and wherein each of the first and second conveyor belt portions has an upper surface, and a lower surface;
a series of regularly spaced followers on said belt, which followers are attached to said conveyor belt;
a conveyor belt drive mechanism comprising at least one rotational drive member which is positioned in, and which rotates in, a plane which is spaced apart from, but parallel to, the upper or lower surfaces of said first or second conveyor belt portions;
wherein said rotational drive member includes a series of openings, to create teeth on the drive member, and when rotated, said teeth releaseably engage with said followers on said belt;
wherein rotation of said drive member continually causes at least one tooth from the drive member teeth to at least partially engage at least one follower, and move said follower in the direction of the belt travel, and thereby, propels the conveyor belt by rotation of said rotational drive member,
wherein said rotational drive member is located on one side of the conveyor belt, between the first and second opposite ends, and located on the same side of the conveyor belt, as the followers, and
wherein said followers are provided on both the upper and lower surface of the belt.

18. A conveyor system as claimed in claim 17 wherein said followers on the upper surface and the lower surface of the belt, are circular in shape, and are connected one to the other, by connectors which extend through said belt.

* * * * *